(12) United States Patent
Sadowski et al.

(10) Patent No.: US 10,698,692 B2
(45) Date of Patent: Jun. 30, 2020

(54) CONTROLLING THE OPERATING SPEED OF STAGES OF AN ASYNCHRONOUS PIPELINE

(71) Applicant: Advanced Micro Devices, Inc., Sunnyvale, CA (US)

(72) Inventors: Greg Sadowski, Boxborough, MA (US); John Kalamatianos, Boxborough, MA (US); Shomit N. Das, Austin, TX (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 298 days.

(21) Appl. No.: 15/216,094

(22) Filed: Jul. 21, 2016

(65) Prior Publication Data

US 2018/0024837 A1    Jan. 25, 2018

(51) Int. Cl.
  *G06F 9/38*        (2018.01)
(52) U.S. Cl.
  CPC .......... *G06F 9/3871* (2013.01); *G06F 9/3836* (2013.01); *G06F 9/3869* (2013.01)
(58) Field of Classification Search
  CPC ............... G06F 9/3871; G06F 15/7825; G06F 17/5059; G06F 9/3869; G06F 9/3836
  See application file for complete search history.

(56) References Cited

U.S. PATENT DOCUMENTS

| | | | |
|---|---|---|---|
| 6,502,202 B1 | 12/2002 | Song | |
| 6,590,424 B2 * | 7/2003 | Singh | G06F 7/00 326/21 |
| 6,867,620 B2 * | 3/2005 | Singh | G06F 9/3871 326/112 |
| 8,677,103 B1 | 3/2014 | Barash | |
| 2005/0210305 A1 | 9/2005 | Kihara | |
| 2012/0166774 A1 | 6/2012 | Tsuji | |
| 2015/0012728 A1 | 1/2015 | Isherwood et al. | |

OTHER PUBLICATIONS

Steven Nowick and Montek Singh, "High-Performance Asynchronous Pipelines—An Overview", 2011, IEEE. (Year: 2011).*
Thonnart et al., "Power Reduction of Asynchronous Logic Circuits Using Activity Detection", 2009, IEEE. (Year: 2009).*
International Search Report and Written Opinion of the International Searching Authority dated Feb. 6, 2018 for PCT Application No. PCT/US2017/042981, 12 pages.
International Preliminary Report on Patentability dated Jan. 31, 2019 in Application No. PCT/US2017/042981, 9 pages.

* cited by examiner

*Primary Examiner* — Benjamin P Geib

(57) ABSTRACT

An asynchronous pipeline includes a first stage and one or more second stages. A controller provides control signals to the first stage to indicate a modification to an operating speed of the first stage. The modification is determined based on a comparison of a completion status of the first stage to one or more completion statuses of the one or more second stages. In some cases, the controller provides control signals indicating modifications to an operating voltage applied to the first stage and a drive strength of a buffer in the first stage. Modules can be used to determine the completion statuses of the first stage and the one or more second stages based on the monitored output signals generated by the stages, output signals from replica critical paths associated with the stages, or a lookup table that indicates estimated completion times.

18 Claims, 6 Drawing Sheets

CONTROLLING THE OPERATING SPEED OF STAGES OF AN ASYNCHRONOUS PIPELINE

GOVERNMENT LICENSE RIGHTS

This invention was made with government support under Prime Contract Number DE-AC52-07NA27344, Subcontract Number B609201 awarded by the Department of Energy (DOE). The Government has certain rights in this invention.

BACKGROUND

Description of the Related Art

Processing systems typically implement a pipeline architecture that includes a series of stages for processing instructions. Each stage performs a task that operates on input data to generate output data. Data is communicated between the stages by registers that may be implemented as flip-flops or latches. The stages access input data from input registers and provide the output data to output registers. The input registers for a stage of the pipeline can receive as input data the output data provided to corresponding output registers by an earlier stage of the pipeline and the output registers of the stage can be input data for a subsequent stage. The stages in the pipeline concurrently operate on multiple input data sets in some cases. For example, pipeline architectures that implement single-instruction-multiple-data (SIMD) operations can concurrently execute the same instruction multiple input data sets, which are referred to as "waves" or "calculation waves." Waves are made up of multiple work items corresponding to the different input data sets. The execution times of the work items typically vary depending on the input data and so the work items in each wave can complete at different times.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
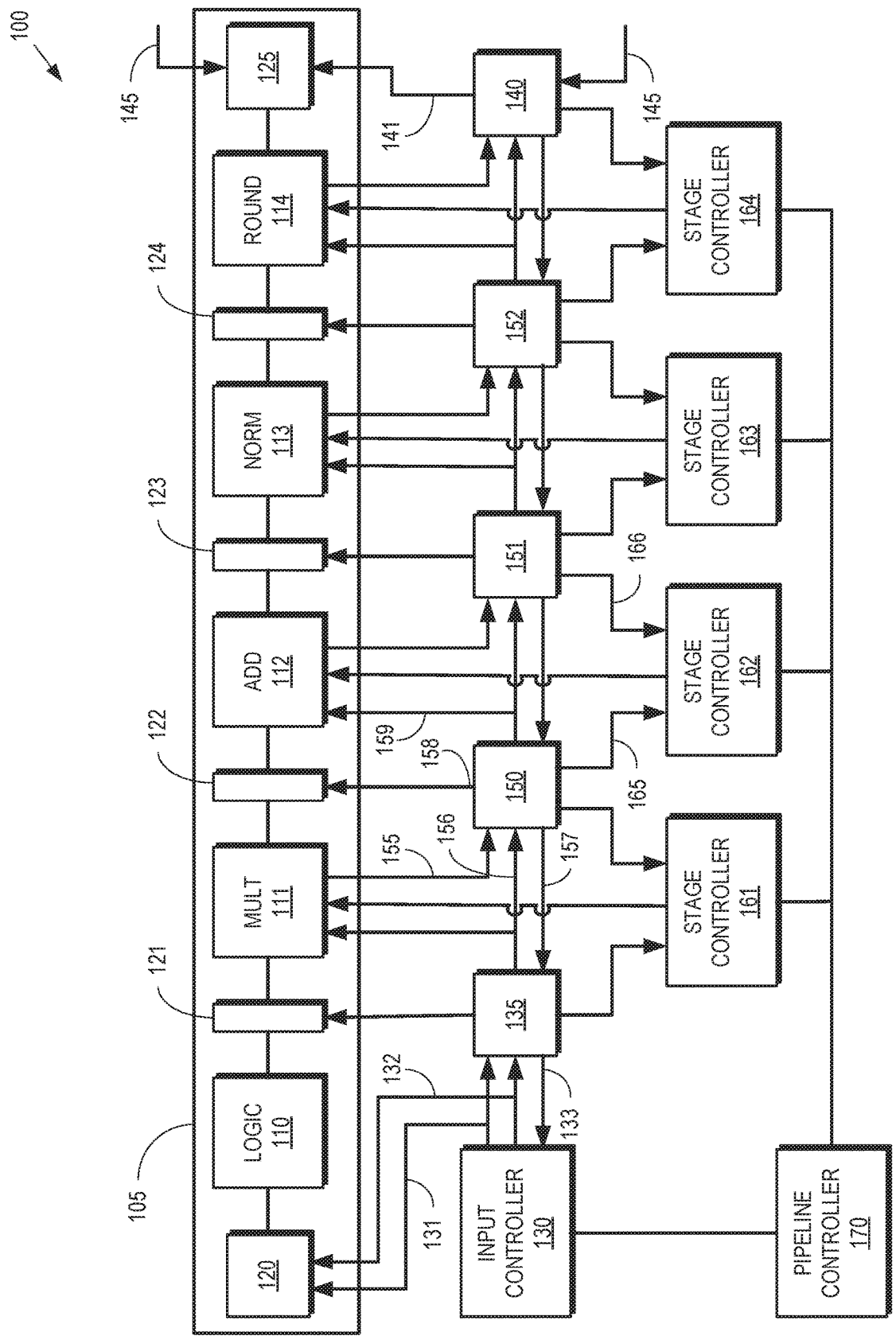
FIG. 1 is a block diagram of a processing system that includes an asynchronous pipeline according to some embodiments.

The stages of execution pipelines are synchronous, in which case the registers between the stages are clocked using the same clock signal, or asynchronous, in which case each stage of the pipeline is self-timed so that different stages can read input data, execute instructions, and write output data independently of the other stages. In either case, the stages complete their tasks at variable latencies that depend on the type of operation performed by the stage, the data operated on by the stage, and the sequence of data values that are operated on by the stage. Stages that complete their tasks earlier than other stages remain idle while waiting for the other stages to complete, which reduces the overall throughput of the pipeline and wastes static power that is consumed by the idle stages. The timing of the synchronous pipelines is typically adjusted based on the latency of critical paths across all stages of the synchronous pipeline during logic synthesis and physical layout of the hardware of the synchronous pipeline to attempt to maximize an operating frequency of the synchronous pipeline. However, synchronous pipelines typically execute a variety of diverse operations that have latencies that differ from the latencies of the critical paths used during the design of the synchronous pipeline. Consequently, the performance of the synchronous pipeline is not always optimal or as energy-efficient as expected.

The performance and energy efficiency of an asynchronous pipeline can be improved by modifying an operating speed of a (first) stage of the asynchronous pipeline based on a comparison of a completion status of the first stage to a completion status of at least one other (second) stage in the asynchronous pipeline. In some embodiments, modifying the operating speed of the first stage of the asynchronous pipeline includes modifying an operating voltage applied to the first stage (or a portion thereof) or modifying a buffer drive strength applied to one or more drive buffers in the first stage. For example, a completion status of a first stage is set to "Done" to indicate that the first stage has completed operations on the input data and generated its output data. At the same time, the completion statuses of an adjacent stage that provides input data to the first stage and another adjacent stage that receives output data from the first stage are both set to "Processing" to indicate that they have not completed their operations on their input data. In that case, the buffer drive strength or the voltage supply for the first stage may be decreased to conserve energy in the first stage while the adjacent stages complete processing. For another example, if the completion status of a first stage is "Processing" while the completion statuses of the adjacent stage that provides input data to the first stage and the other adjacent stage that receives output data from the first stage are both "Done," the buffer drive strength or the voltage supply for the first stage may be increased to accelerate processing by the first stage to decrease its latency and reduce the idle time in the second stages.

The completion statuses of the first and second stages can be determined by monitoring output signals generated by the first and second stages in response to initiating execution of calculation waves by the first and second stages. In some variations, the completion statuses of the first and second stages are determined by applying input signals to replica critical paths in the first and second stages simultaneously with initiating execution of calculation waves in the first and second stages and then determining that the first and second stages are complete in response to detecting output signals at outputs of the replica critical paths. The replica critical paths are defined based on circuit simulations of the stages. In some embodiments, the completion status of the stages indicate estimated completion times for the stages or portions of the stages. For example, the completion statuses of the first and second stages can be determined using a lookup table that provides estimates of the completion time based on the instruction type (as indicated by an instruction opcode) and characteristics of the input data. In other embodiments, the completion statuses of the stages are determined based on monitoring signals inside a logic cloud of a stage or output signals for activity. For example, if all output signals from the stage remain unchanged for some time, the stage is likely to have completed its task. For another example, if one or more signals at a predetermined location inside the logic cloud of the stage remain unchanged, the stage is likely to have completed a particular percentage of its calculations, e.g. the stage may have completed 50% of its operations.

FIG. 1 is a block diagram of a processing system 100 that includes an asynchronous pipeline 105 according to some embodiments. As used herein, the term "asynchronous pipeline" indicates that stages of the asynchronous pipeline operate according to a clock or timing reference that is not synchronized with a global clock or timing reference used by entities outside the asynchronous pipeline within the processing system 100. Furthermore, individual stages within the asynchronous pipeline are not necessarily synchronized with each other and are able to operate according to their own internal clocks in some cases. The stages in the asynchronous pipeline are sometimes referred to as "self-timed" stages. Operating speeds of the stages the asynchronous pipeline can therefore vary independently of the operating speeds of the other stages in the asynchronous pipeline, as discussed herein.

The asynchronous pipeline 105 includes a plurality of stages 110, 111, 112, 113, 114 that are collectively referred to herein as "the stages 110-114." Data is stored at various points in the asynchronous pipeline 105 using pipeline registers 120, 121, 122, 123, 124, 125 (collectively referred to herein as "the registers 120-125") that can be implemented using flip-flops, latches, or other storage devices. In the illustrated embodiment, the stage 110 performs logic operations on input data stored in the register 120, which can be implemented as a flip-flop. The stage 110 generate output data that is stored in the register 121, which can be implemented as a latch. The stage 111 performs multiplication operations on input data stored in the register 121 and generates output data that is stored in the register 122, which can be implemented as a latch. The stage 112 performs addition operations on input data stored in the register 122 and generates output data that is stored in the register 123, which can be implemented as a latch. The stage 113 performs normalization operations on input data stored in the register 123 and generates output data that is stored in the register 124, which can be implemented as a latch. The stage 114 performs rounding operations on input data stored in the register 124 and generates output data that is stored in the register 125, which can be implemented as a flip-flop. Although five stages and a corresponding number of pipeline registers are shown in the asynchronous pipeline 105, some embodiments of the asynchronous pipeline 105 include more or fewer stages that perform the same or different operations, as well as more or fewer pipeline registers.

An input controller 130 provides a clock signal 131 and a valid signal 132 to the register 120 and a module 135. The clock signal 131 is synchronized with an external clock signal that is used in a synchronous domain that provides data to the register 120. The module 135 therefore acts as a boundary between the synchronous domain and the asynchronous pipeline 105, e.g., by converting signals from the synchronous domain to the asynchronous domain of the pipeline 105. The module 135 provides feedback 133 that indicates whether the asynchronous pipeline 105 is ready to process additional data. For example, the feedback 133 can indicate that the logic 110 is ready to process additional data, which is then clocked into the register 120 by the input controller 130. A module 140 is used to control signals output from the asynchronous pipeline 105. Some embodiments of the module 140 act as a boundary between the asynchronous domain of the asynchronous pipeline 105 and the synchronous domain within the processing system 100. For example, the module 140 can provide a valid signal 141 to indicate that valid data is ready to be clocked into the register 125. The module 140 and the register 140 can also receive a clock signal 145, which is synchronized to the external clock signal used in the synchronous domain.

Modules 150, 151, 152 (collectively referred to herein as "the modules 150-152") operate in conjunction with the modules 135, 140 to coordinate operation of the stages 110-114. For example, the module 150 receives a completion status signal 155 from the stage 111 to indicate the completion status of the stage 111 and a start signal 156 from the module 135 indicating that execution of a task on the input data stored in the register 121 has been initiated by the stage 111. The module 150 provides feedback 157 indicating that the next stage 112 is ready to begin execution of a task on a next set of data, a latch control signal 158 that controls latching of data provided by the stage 111 into the register 122 and accessing of the data from the register 122 by the stage 112. The module 150 also provides a start signal 159 that initiates execution of a task that operates on the data stored in the register 122, as well as indicating to the subsequent module 151 that execution has been initiated. The modules 135, 140, 151, 152 provide and receive corresponding signals, which are not indicated by corresponding reference numerals in the interest of clarity.

Stage controllers 161, 162, 163, 165 (collectively referred to herein as "the stage controllers 161-164") are used to control operation of the stages 111-114 in the asynchronous pipeline 105. Some embodiments of the stage controller 162 are configured to control the stage 112 based on a signal 165 indicating provided by the module 150 to indicate completion status information for the stage 111 and a signal 166 provided by the module 151 to indicate completion status information for the stage 113. The stage controller 162 provides a control signal 167 that is used to set or modify an operating speed of the stage 112. The stage controller 162 determines the operating speed (or a modification thereof) of the stage 112 based on the completion status of the stage 111, the completion status of the stage 112, the completion status of the stage 113, or a combination thereof. The stage controllers 161, 163, 164 are able to control the operating speed of the corresponding stages 111, 113, 114 on the basis of the completion status of one or more of the other stages, as discussed herein. In the interest of clarity, reference numerals are not provided to indicate all the corresponding signaling provided or received by the stages 111, 113, 114.

In some embodiments, the operating speeds of the stages 111-114 are determined by drive strengths of one or more buffers implemented in the stages 111-114, operating voltages of the stages 111-114, or combinations thereof. For example, the stage controller 162 is able to determine modifications to the operating speed of the stage 112 based on the completion statuses of the stages 111-113 according to Table 1.

TABLE 1

| Stage 111 status | Stage 112 status | Stage 113 status | Buffer drive strength control | Voltage supply control |
|---|---|---|---|---|
| Processing | Processing | Processing | No change | No change |
| Processing | Processing | Done | No change | Small increase |
| Processing | Done | Processing | Small decrease | Small decrease |
| Processing | Done | Done | Small decrease | Small decrease |
| Done | Processing | Processing | No change | Small increase |
| Done | Processing | Done | Large increase | Large increase |
| Done | Done | Processing | Large decrease | Large decrease |
| Done | Done | Done | No change | Large decrease |

The completion statuses in Table 1 indicate whether the corresponding stage is still executing its current task (Processing) or the corresponding stage has completed executing the current task (Done) and is therefore ready to accept a new task for execution. The operating speed can be modified to save energy or accelerate processing by the stage 112. For example, if the completion status of stage 111 is Processing, the completion status of stage 112 is Done, and the completion status of stage 113 is Processing, the stage controller 162 decreases the buffer drive strength and the voltage supply provided to the stage 112 to reduce energy consumption by the stage 112. For another example, if the completion status of stage 111 is Done, the completion status of stage 112 is Processing, and the completion status of stage 113 is Done, the stage controller 162 increases the buffer drive strength and the voltage supply provided to the stage 112 to accelerate processing by the stage 112. Some embodiments of Table 1 may be stored in a lookup table, as discussed herein.

Modifying the voltage supply to the stages 111-114 affects the operating speed of all of the logic within the stages 111-114. However, in some embodiments, the voltage supplied to portions or regions of the stages 111-114 is modified separately from other portions or regions of the stages 111-114 to control the operating speed of separate portions or regions, as discussed herein. Modifying the drive strength of buffers within the stages 111-114 affects portions or regions of the stages 111-114 that are upstream from the buffers. For example, modifying the drive strength of buffers at the beginning, middle, or end of each stage 111-114 can be used to modify the operating speed of the paths in corresponding portions of the stages 111-114. Configurable drive buffers can also be placed on long wires inside the logic of the stages 111-114 to control routing delay. Increasing the drive strength of a buffer typically decreases the propagation time of signals along paths in the stages 111-114, which may decrease the computation time along the paths. In some embodiments, the signal propagation speed is controlled by using a separate voltage source to supply the interconnect logic. The separate voltage source is controlled independently of another voltage source that is used to supply other portions of the logic in the stages 111-114. In some variations, the voltage control fine-grained, e.g., the voltage may be modified in 10 milli-Volt (mV) steps with a transition time between voltage states that is as short as one nanosecond. Foot transistors may be used for power gating or voltage control of portions of the logic of the stages 111-114.

Some embodiments of the processing system 100 include a pipeline controller 170 that is connected to the input controller 130 or the stage controllers 161-164. The pipeline controller 170 determines a completion time for the pipeline stages 110-114. The stage controllers 161-164 can attempt to adjust the completion times of the corresponding stages 110-114 based on the overall completion time for the asynchronous pipeline 105. As discussed herein, the adjustments include supply voltage changes and modifications of drive strengths of buffers in the logic cones of the stages 110-114. For example, the pipeline controller 170 is able to control asynchronous execution of instructions in the lanes of an asynchronous single-instruction-multiple-data (SIMD) pipeline that is implemented by a computer unit. Other circuitry or pipelines within the computer unit can operate in a synchronous manner and communicate with the asynchronous SIMD pipeline via specialized buffers. The pipeline controller 170 can help eliminate lane divergence (i.e., the variation of an instruction's completion time across all SIMD lanes in a wave) by monitoring the progress of execution of a single instruction across the lanes of the asynchronous SIMD pipeline and rebalancing the speed of task completion (possibly at the last pipeline stage 114 to minimize complexity) so that all lanes complete their tasks for the same instruction at approximately the same time. Controlling lane divergence using the pipeline controller 170 may simplify (a) the logic of bypassing the data to its consumer instructions that may follow in the SIMD pipeline and (b) the logic of writing the results back to the VRF in a synchronous domain. In some variations, the individual stage controllers 161-164 attempt to improve timing by completing an instruction's execution in less overall time and reduce energy consumption.

Figure 2:
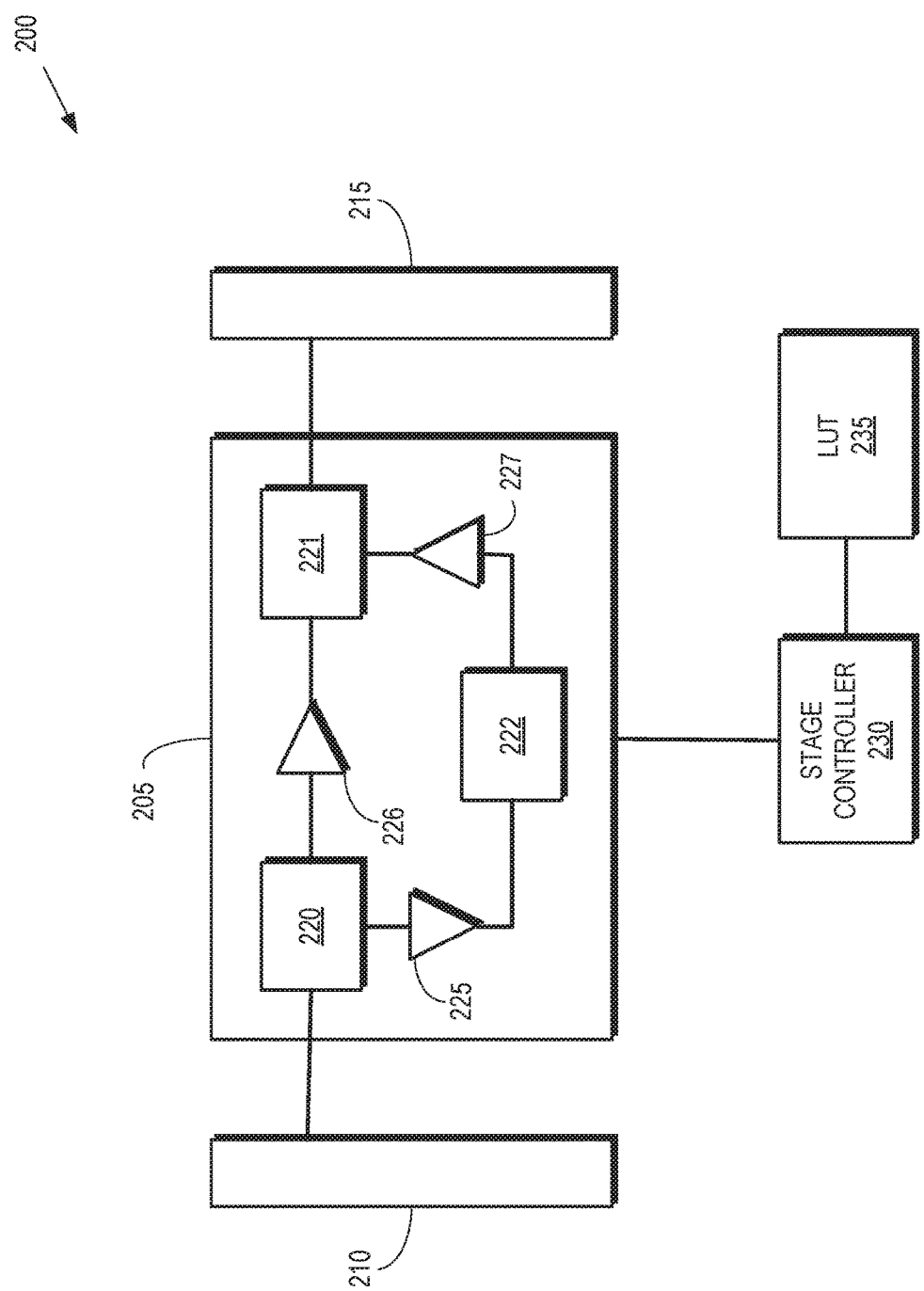
FIG. 2 is a block diagram of a portion of an asynchronous pipeline according to some embodiments.

FIG. 2 is a block diagram of a portion 200 of an asynchronous pipeline according to some embodiments. The portion 200 includes a stage 205 that accesses input data from an input register 210 and provides output data to an output register 215. The portion 200 is used in some embodiments of the asynchronous pipeline 105 shown in FIG. 1. In some variations, the input register 210 and the output register 215 are used to implement one or more of the registers 121-124 shown in FIG. 1 and the stage 225 is used to implement a corresponding one of the stages 110-114 shown in FIG. 1. The stage 205 includes logic regions 220, 221, 222 (collectively referred to herein as "the logic regions 220-222") that implement logic to perform portions of the tasks that are allocated to the stage 205. The logic regions 220-222 are connected by an interconnect network including buffers 225, 226, 227 (collectively referred to herein as "the buffers 225-227") that provide drive currents to upstream regions of the logic in the portion 200. The buffers 225-227 are configurable buffers that are able to operate at variable drive strengths determined based on control signals received by the buffers 225-227.

The portion 200 also includes a stage controller 230 that can set or modify an operating speed of the stage 205 (or portions thereof) based on completion statuses of other stages (not shown) in the asynchronous pipeline. In some variations, the stage controller 230 corresponds to one of the stage controllers 161-164 shown in FIG. 1. Some embodiments of the stage controller 230 modify the operating voltage of the stage 205 to modify the operating speed of the stage 205. The operating voltage applied to the entire stage 205 can be modified to modify the operating speeds of the logic regions 220-222 or the operating voltages applied to the logic regions 220-222 can be modified separately to modify one or more operating speeds of one or more of the logic regions 220-222. Some embodiments of the stage controller 230 modify the drive strengths of one or more of the buffers 225-227 to modify the operating speeds of logic downstream from the corresponding buffers 225-227. For example, the stage controller 230 can modify the drive strength of the buffer 225 to modify the operating speeds of downstream logic such as the logic region 222 and the logic region 221.

Some embodiments of the portion 200 include a lookup table (LUT) 235 that is incorporated in the stage controller 230 or stored in a memory that is accessible to the stage controller 230. The lookup table 235 includes entries that include estimates of a completion time for different types of instructions that can be executed by the stage 205. For example, each entry in the lookup table 235 includes an estimate of a completion time that is indexed by an instruction opcode, an instruction type, input data values, and the like. In some variations, the estimates of the completion time are determined using targeted or random circuit simulations of the stage 205. The stage controller 230 can then estimate a completion status of the stage 205 based on the opcode or type of the instruction being executed by the stage 205 or values of the data being operated on by the instructions, e.g., values of the data stored in the input register 215. For example, the stage controller 230 can receive a signal from a module (such as one of the modules 135, 140, 150-152 shown in FIG. 1) indicating a start time for initiation of execution of a task including the instruction by the stage 205. The stage controller 230 estimates the completion status of the stage 205 by comparing the current time to the start time plus an estimated completion time that is determined based on entries in the lookup table 235. Some embodiments of the stage controller 230 estimate completion times for other stages (such as the stages that provide input data to the input register 210 or access output data from the output register 215) based on information stored in the lookup table 235.

Figure 3:
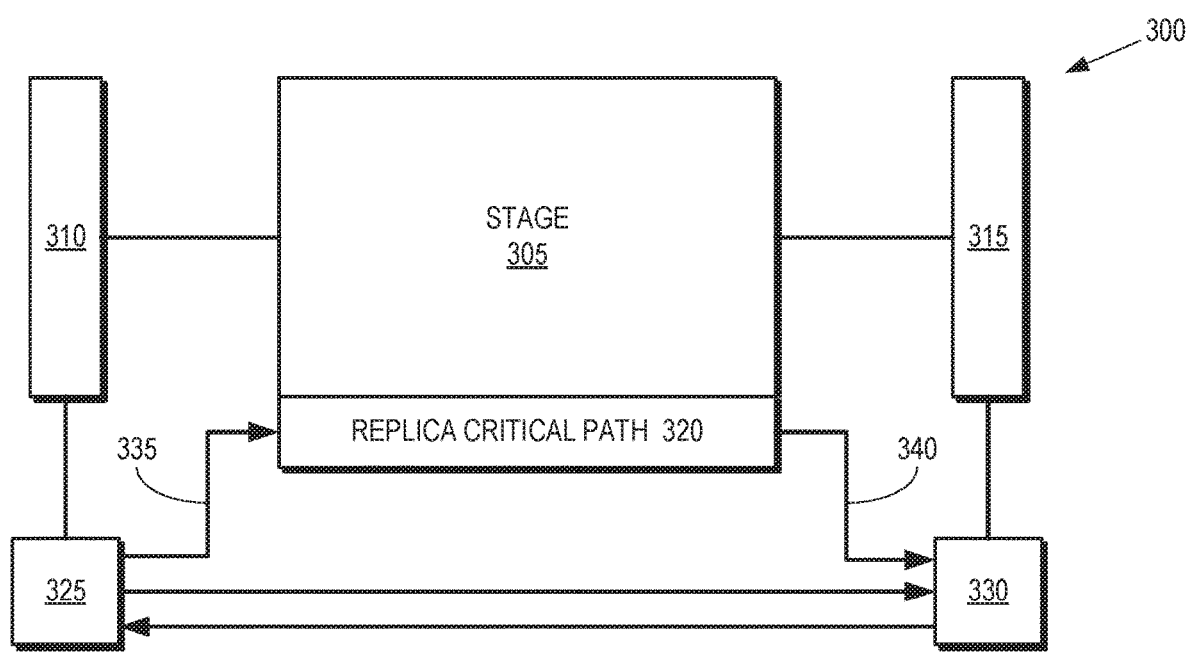
FIG. 3 is a block diagram of a portion of an asynchronous pipeline that includes a replica critical path according to some embodiments.

FIG. 3 is a block diagram of a portion 300 of an asynchronous pipeline that includes a replica critical path according to some embodiments. The portion 300 includes a stage 305 that accesses input data from an input register 310 and provides output data to an output register 315. The portion 300 is used in some embodiments of the asynchronous pipeline 105 shown in FIG. 1. In some variations, the input register 310 and the output register 315 are used to implement one or more of the registers 121-124 shown in FIG. 1 and the stage 305 is used to implement a corresponding one of the stages 110-114 shown in FIG. 1.

The stage 305 is associated with a replica critical path 320 that includes logic that is constructed to replicate the timing of one or more critical paths in the stage 305 so that the replica critical path 320 completes processing of input data after a time interval that corresponds to the time required for a critical path in the stage 305 to complete processing of input data. For example, the replica critical path 320 can include a number of gates that matches a number of gates implemented along a critical path of the stage 305. The replica critical path 320 can also be constructed to match the fan-in and fan-out values of the gates along the critical path of the stage 305. Some embodiments of the replica critical path 320 include logic that is not necessarily identical to the logic of the critical path in the stage 305. Instead, the logic of the replica critical path 320 is constructed so that input signals change value as they flow across the gates of the replica critical path 320 to facilitate monitoring the flow of signals along the replica critical paths 320. A latency between the replica critical path 320 and the actual critical path can be determined using circuit simulations.

The portion 300 also includes modules 325, 330 that provide and receive signals that are used to estimate the completion status of the stage 305. The modules 325, 330 are used to implement some embodiments of the modules 120, 125, 150-152 shown in FIG. 1. Some embodiments of the module 325 provide a start signal 335 to cause the replica critical path 320 to begin processing input data. The start signal 335 is provided simultaneously with a start signal that is used to initiate processing of input data stored in the input registers 310 by the stage 305. The module 330 monitors output signals 340 generated by the replica critical path 320 in response to the start signal 335 to determine the completion status of the replica critical path 320. In some variations, the module 330 determines that the replica critical path 320 has completed operations on the input data by detecting a particular pattern of output signal 340 or by determining that data stored in output registers associated with the replica critical path 320 has reached a steady-state. The latency can be added to or subtracted from the completion time determined by the module 330 for the replica critical path 320 to compensate for differences between the estimated completion time and the actual completion time for the stage 305.

Figure 4:
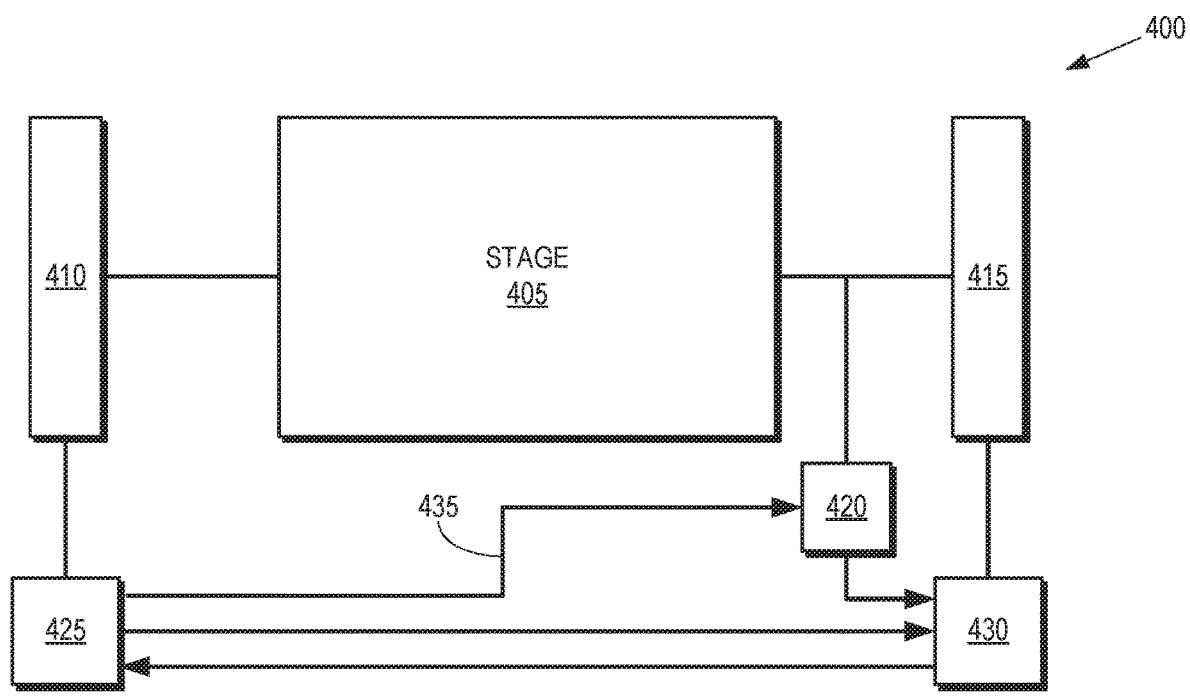
FIG. 4 is a block diagram of a portion of an asynchronous pipeline according to some embodiments.

FIG. 4 is a block diagram of a portion 400 of an asynchronous pipeline according to some embodiments. The portion 400 includes a stage 405 that accesses input data from an input register 410 and provides output data to an output register 415. The portion 400 is used in some embodiments of the asynchronous pipeline 105 shown in FIG. 1. In some variations, the input register 410 and the output register 415 are used to implement one or more of the registers 121-124 shown in FIG. 1 and the stage 405 is used to implement a corresponding one of the stages 110-114 shown in FIG. 1.

A status module 420 is configured to monitor output signals provided by the stage 405. The status module 420 uses characteristics of the output signals to determine a completion status for the stage 405. For example, the status module 420 can monitor changes in the output signals generated by the stage 405. The status module 420 determines that the stage 405 is processing its current task if the values of the output signals are changing. In some variations, the status module 420 determines that the stage 405 has completed processing its current task if the values of the output signals are in a steady-state or changing at a rate that is below a threshold.

The portion 400 also includes modules 425, 430 that provide and receive signals that are used to estimate the completion status of the stage 405. The modules 425, 430 are used to implement some embodiments of the modules 120, 125, 150-152 shown in FIG. 1. Some embodiments of the module 425 provide a start signal 435 to the status module 420 to indicate that the stage 405 has begun processing its task using input data stored in the input register 410. The start signal 435 is provided simultaneously with a start signal that is used to initiate processing of input data stored in the input registers 410 by the stage 405. As discussed above, the module 430 begins monitoring output signals generated by the stage 405 in response to the start signal 435 to determine the completion status of the stage 405. The status module 420 provides a signal indicating the completion status of the stage 405 to the module 430. For example, the status module 420 can assert a logic-low signal to the module 430 while the completion status of the stage 405 is "Processing" and then assert a logic-high signal to the module 430 in response to the completion status of the stage 405 transitioning to "Done."

Figure 5:
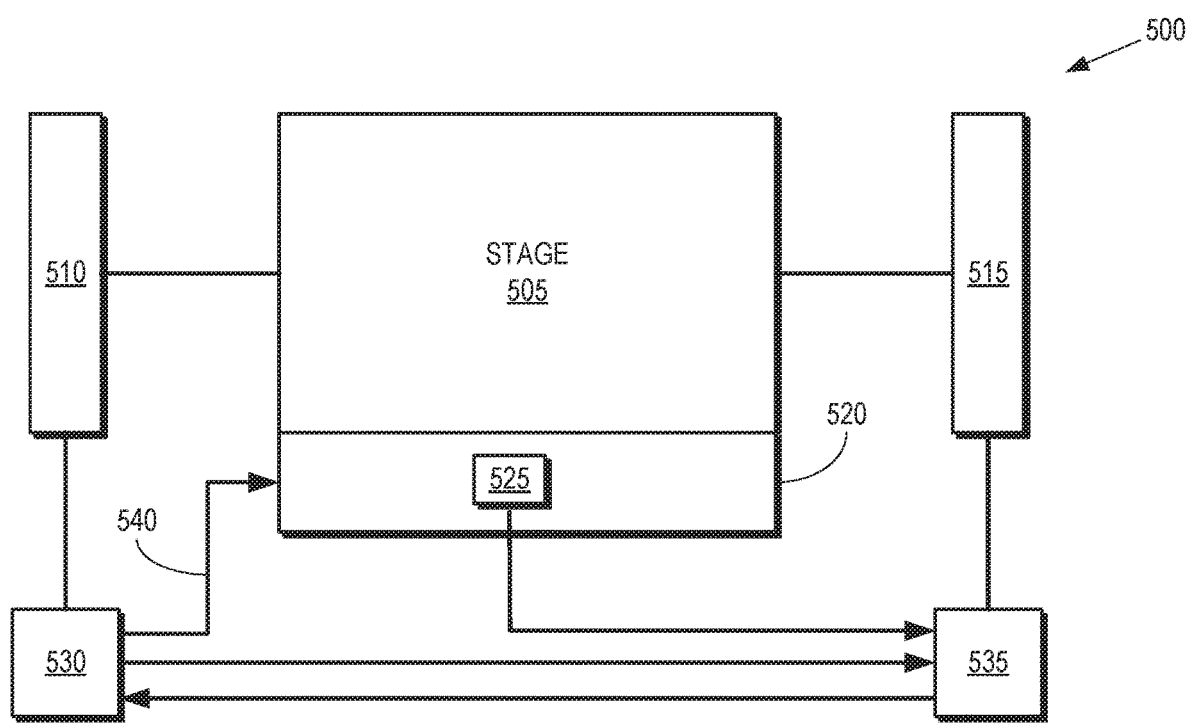
FIG. 5 is a block diagram of a portion of an asynchronous pipeline that implements intermediate completion status detection in a replica critical path according to some embodiments.

FIG. 5 is a block diagram of a portion 500 of an asynchronous pipeline that implements intermediate completion status detection in a replica critical path according to some embodiments. The portion 500 includes a stage 505 that accesses input data from an input register 510 and provides output data to an output register 515. The portion 500 is used in some embodiments of the asynchronous pipeline 105 shown in FIG. 1. In some variations, the input register 510 and the output register 515 are used to implement one or more of the registers 121-124 shown in FIG. 1 and the stage 505 is used to implement a corresponding one of the stages 110-114 shown in FIG. 1.

The stage 505 is associated with a replica critical path 520 that includes logic that is constructed to replicate the timing of one or more critical paths in the stage 505 so that the replica critical path 520 completes processing of input data after a time interval that corresponds to the time required for a critical path in the stage 505 to complete processing of input data. The replica critical path 520 shares some features of the replica critical path 320 shown in FIG. 3. However, the replica critical path 520 differs from the replica critical path 320 because the replica critical path 520 includes logic 525 (such as registers, flip-flops, latches, or other circuitry) that is used to determine an intermediate completion status at a location between the beginning and the end of the replica critical path 520. For example, the logic 525 can include registers to store results produced by the replica critical path 520 at a point halfway through execution of the processes in the replica critical path 520.

The portion 500 also includes modules 530, 535 that provide and receive signals that are used to estimate the completion status of the stage 505. The modules 530, 535 may be used to implement some embodiments of the modules 120, 125, 150-152 shown in FIG. 1. Some embodiments of the module 530 provide a start signal 540 to cause the replica critical path 520 to begin processing input data. The start signal 540 is also provided to the logic 525. The start signal 540 is provided simultaneously with a start signal that is used to initiate processing of input data stored in the input registers 510 by the stage 505. The logic 525 is able to determine the intermediate completion status of the replica critical path 520 in response to the start signal 540, e.g., by monitoring characteristics of the signals produced at the logic 525 by the replica critical path 520. For example, the logic 525 can determine that the replica critical path 520 has completed operations on the input data by detecting a particular pattern of signals received by the logic 525 or by determining that data stored in registers associated with the logic 525 has reached a steady-state. The logic 525 is able to provide a signal to the module 535 indicating the intermediate completion status of the replica critical path 520. As discussed herein, a latency can be added to or subtracted from the intermediate completion time determined by the logic 525 for the replica critical path 520 to compensate for differences between the estimated intermediate completion time and the actual intermediate completion time for the stage 505.

The intermediate completion status are used by a stage controller (such as the stage controllers 161-164) to modify operating speeds of portions of the stage 505. For example, the stage controller can use the completion status generated by the logic 525 to modify an operating speed of a portion of the stage 505 that precedes the logic 525 (e.g., circuitry that is upstream from the logic 525) or a portion of the stage 505 that follows the logic 525 (e.g., circuitry that is downstream from the logic 525). Although a single logic 525 is shown in FIG. 5, some embodiments of the replica critical path 520 include additional completion status logic that may be located at different locations within the replica critical path 520. Furthermore, in some embodiments, logic to detect one or more intermediate completion statuses for the replica critical path 520 is combined with logic to detect an overall completion status of the replica critical path 520, such as the logic implemented in the module 330 shown in FIG. 3.

Figure 6:
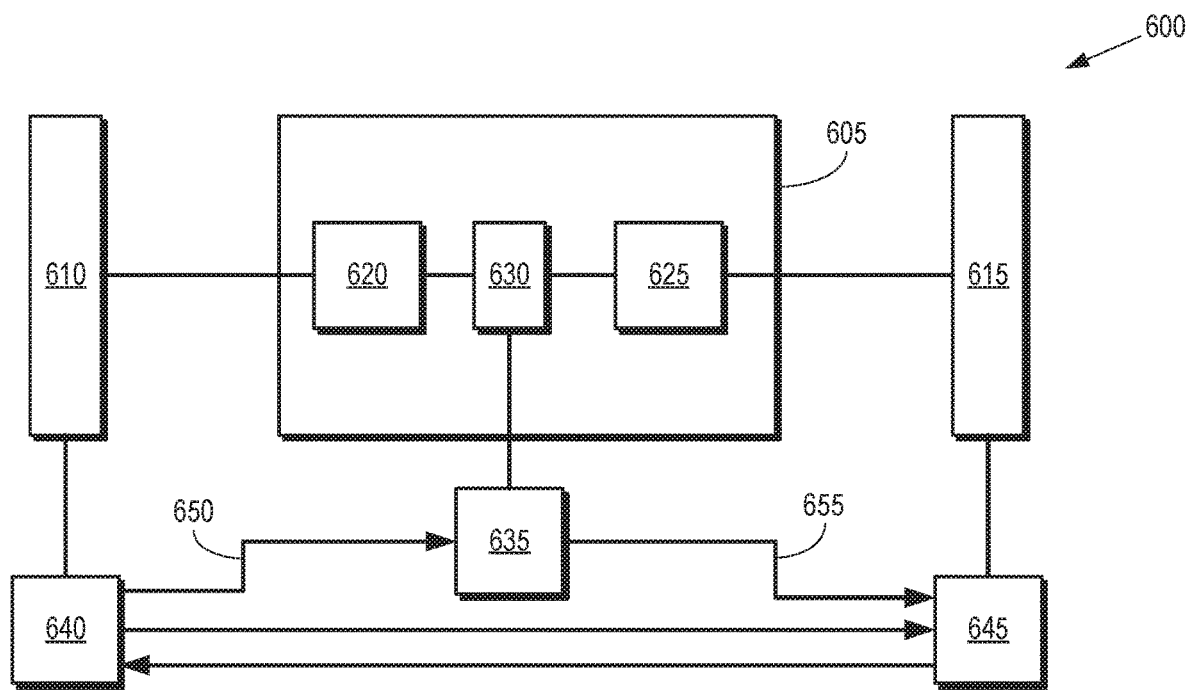
FIG. 6 is a block diagram of a portion of an asynchronous pipeline that implements intermediate completion status detection according to some embodiments.

FIG. 6 is a block diagram of a portion 600 of an asynchronous pipeline that implements intermediate completion status detection according to some embodiments. The portion 600 includes a stage 605 that accesses input data from an input register 610 and provides output data to an output register 615. The portion 600 is used in some embodiments of the asynchronous pipeline 105 shown in FIG. 1. In some variations, the input register 610 and the output register 615 are used to implement one or more of the registers 121-124 shown in FIG. 1 and the stage 605 is used to implement a corresponding one of the stages 110-114 shown in FIG. 1.

The stage 605 includes a region 620 of circuitry for performing a portion of the tasks allocated to the stage 605 and a region 625 of circuitry for performing another portion of the tasks allocated to the stage 605. A set of registers 630 are implemented intermediate the regions 620, 625. The registers 630 are configured to store results of processing performed by the region 620 and provide the results to the region 625 for additional processing in the stage 605. The registers 630 are connected to a status monitor 635 that is configured to monitor output signals provided by the region 620 to the registers 630. The status module 635 uses characteristics of the values stored in the registers in 630 to determine a completion status for the region 620. For example, the status module 635 can monitor changes in the output signals generated by region 620 and determine that the region 620 is processing its current task if the values of the output signals stored in the registers is 630 are changing. Some variations of the status module 630 can also determine that the region 620 has completed processing its current task if the values stored in the registers 630 are in a steady-state or changing at a rate that is below a threshold.

The portion 600 also includes modules 640, 645 that provide and receive signals that are used to estimate the intermediate completion status of the stage 605. The modules 640, 645 are used to implement some embodiments of the modules 120, 125, 150-152 shown in FIG. 1. Some embodiments of the module 640 provide a start signal 650 to the status module 635 to indicate that the stage 605 has begun processing its task using input data stored in the input register 610. The start signal 650 is provided simultaneously with a start signal that is used to initiate processing of input data stored in the input registers 610 by the stage 605. As discussed above, the status module 635 begins monitoring output signals provided to the registers 630 in response to the start signal 650 to determine the completion status of the region 620. The status module 635 then provides a signal 655 indicating the completion status of the region 620 to the module 645. For example, the status module 635 can assert a logic-low signal to the module 645 while the completion status of the region 620 is "Processing" and then assert a logic-high signal to the module 645 in response to the completion status of the region 620 transitioning to "Done."

The intermediate completion status is used by a stage controller (such as the stage controllers 161-164 shown in FIG. 1) to modify operating speeds of the regions 620, 625 of the stage 605. For example, the stage controller can use the completion status generated by the status module 635 to modify an operating speed of the region 620, the region 625, or a combination thereof. Although a single set of registers 630 and a single status module 635 are shown in FIG. 6, some embodiments of the portion 600 include additional completion status logic that is located at different locations within the stage 605. Furthermore, in some embodiments, logic to detect one or more intermediate completion statuses for the regions 620, 625 is combined with logic to detect an overall completion status of the stage 605, such as the logic implemented in the module 420 shown in FIG. 4.

Figure 7:
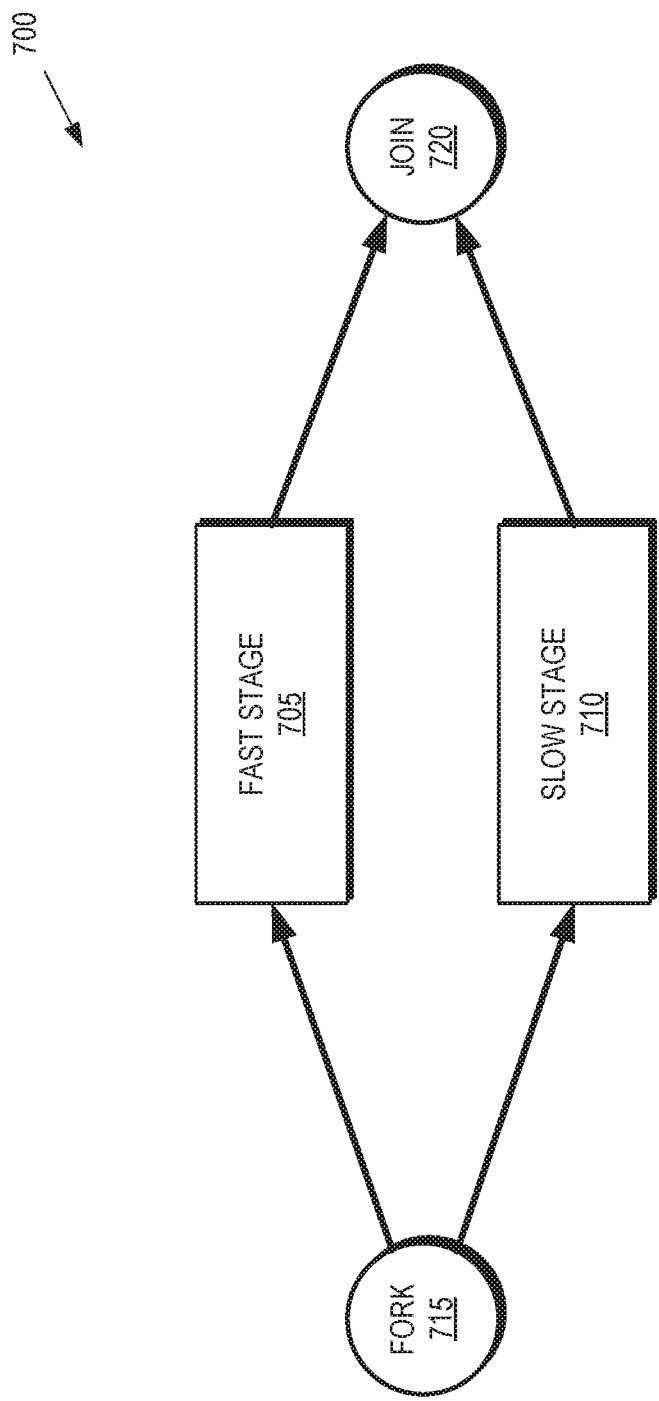
FIG. 7 is a block diagram of a portion of an asynchronous pipeline that implements parallel processing according to some embodiments.

FIG. 7 is a block diagram of a portion 700 of an asynchronous pipeline that implements parallel processing according to some embodiments. The portion 700 includes a fast stage 705 that completes tasks at a relatively higher rate or speed and a slow stage 710 that completes tasks at a relatively slower rate or speed. The portion 700 is implemented in some embodiments of the asynchronous pipeline 105 shown in FIG. 1. In some variations, each the stages 110-114 shown in FIG. 1 represents more than one stage operating in parallel. For example, the stage 111 represents at least a pair of stages that are configured to perform multiplication operations on different input data in parallel. One of the stages can complete tasks at a relatively high rate or speed and one of the other stages can complete tasks at a relatively low rate or speed.

The asynchronous pipeline begins execution of the parallel stages 705, 710 at a fork 715 and the results of the operations of the parallel stages 705, 710 are combined at a join 720. The parallel branches cannot complete the join 720 until execution of the tasks by the parallel stages 705, 710 are both complete. Thus, one or more stage controllers (such as the stage controllers 161-164 shown in FIG. 1) coordinate operation of the stages 705, 710 based on their completion statuses. For example, the stage controller can reduce an operating speed of the relatively fast stage 705, increase in operating speed of the relatively slow stage 710, or perform a combination of these modifications so that both of the stages 705, 710 complete at a time that is approximately equal to a target completion time for the parallel stages 705, 710.

Figure 8:
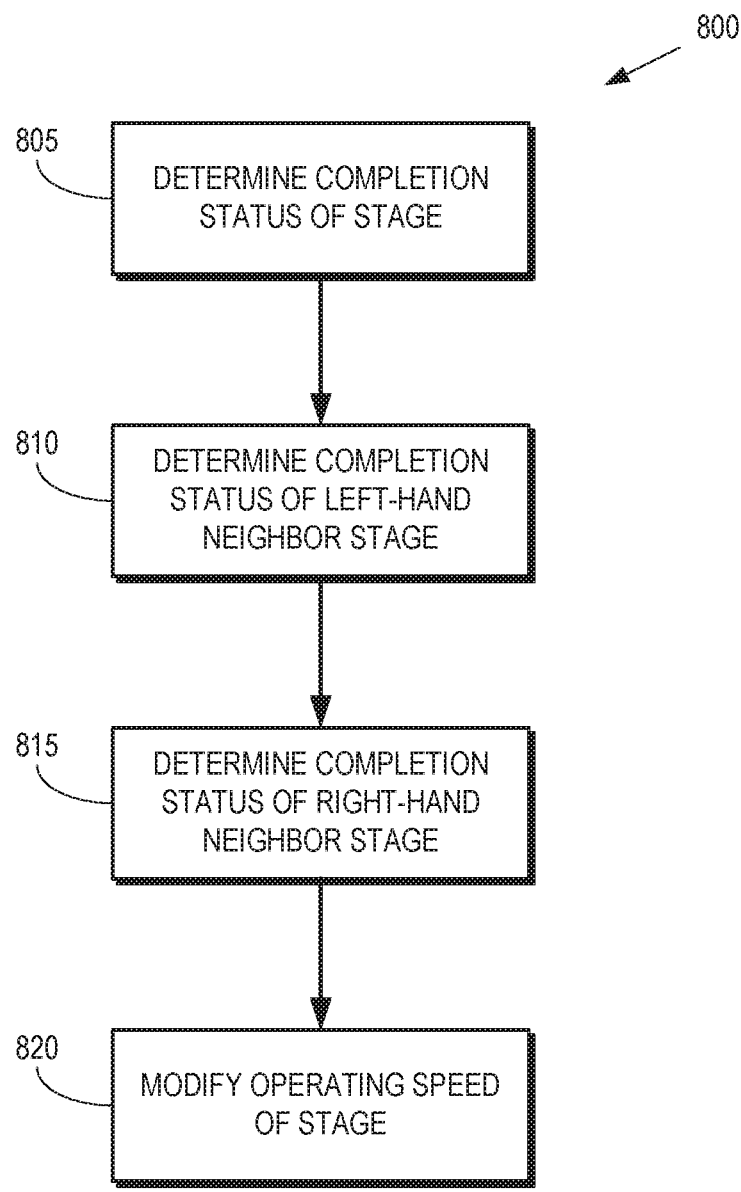
FIG. 8 is a flow diagram of a method for modifying an operating speed of a stage in an asynchronous pipeline according to some embodiments.

FIG. 8 is a flow diagram of a method 800 for modifying an operating speed of a stage in an asynchronous pipeline according to some embodiments. The method 800 is implemented in some embodiments of the processing system 100 shown in FIG. 1. The stage receives input data produced by a left-hand neighbor stage and generates output data that is provided as input data to a right-hand neighbor stage. Some embodiments of the stage correspond to the stage 112 shown in FIG. 1. The left-hand neighbor stage then corresponds to the stage 111 and the right-hand neighbor stage corresponds to the stage 113 shown in FIG. 1.

At block 805, a stage controller (such as the stage controller 162 shown in FIG. 1) accesses information indicating a completion status of the stage. The completion status can include information indicating that the stage has not yet completed a task that is executing on the stage, in which case the completion status for the stage is "Processing." The completion status can also include information indicating that the stage has completed the task, in which case the completion status for the stage is "Done." The completion status can also include information indicating intermediate completion statuses associated with portions or regions of the stage, as discussed herein.

At block 810, the stage controller accesses information indicating a completion status of the left-hand neighbor stage. The completion status can include information indicating that the left-hand neighbor stage has not yet completed a task that is executing on the left-hand neighbor stage, in which case the completion status for the left-hand neighbor stage is "Processing." The completion status can also include information indicating that the left-hand neighbor stage has completed the task, in which case the completion status for the left-hand neighbor stage is "Done." The completion status can also include information indicating intermediate completion statuses associated with portions or regions of the left-hand neighbor stage, as discussed herein. Some embodiments of the stage are not associated with a left-hand neighbor stage of the asynchronous pipeline. For example, the stage 110 shown in FIG. 1 is not associated with a left-hand neighbor stage, in which case block 810 may be bypassed.

At block 815, the stage controller accesses information indicating a completion status of the right-hand neighbor stage. The completion status can include information indicating that the right-hand neighbor stage has not yet completed a task that is executing on the right-hand neighbor stage, in which case the completion status for the right-hand neighbor stage is "Processing." The completion status can also include information indicating that the right-hand neighbor stage has completed the task, in which case the completion status for the right-hand neighbor stage is "Done." The completion status can also include information indicating intermediate completion statuses associated with portions or regions of the right-hand neighbor stage, as discussed herein. Some embodiments of the stage are not associated with a right-hand neighbor stage of the asynchronous pipeline. For example, the stage 114 shown in FIG. 1 is not associated with a right-hand neighbor stage, in which case block 815 may be bypassed.

At block 820, the stage controller modifies an operating speed of the stage based on the completion status of the stage, the completion status of the left-hand neighbor stage (if available), and the completion status of the right-hand neighbor stage (if available). The operating speed can be modified by modifying buffer drive strength or voltage is applied to the stage, or portions thereof, as discussed herein.

In some embodiments, the apparatus and techniques described above are implemented in a system comprising one or more integrated circuit (IC) devices (also referred to as integrated circuit packages or microchips), such as the asynchronous pipeline described above with reference to FIGS. 1-8. Electronic design automation (EDA) and computer aided design (CAD) software tools are typically used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus comprising:
   an asynchronous pipeline comprising a first stage, a second stage, and a third stage, wherein the first stage is consecutive to the second stage in the pipeline and the third stage is consecutive to the first stage in the pipeline and wherein the second stage provides an input to the first stage and wherein the first stage provides an input to the third stage;
   a controller to modify an operating speed of the first stage based on a comparison of a completion status of the first stage to a completion status of the second stage and to a completion status of the third stage; and
   wherein the first stage includes a buffer providing a drive current to a portion of the first stage, and wherein the controller adjusts a strength of the drive current based on the comparison of the completion statuses of the first stage and the second stage.

2. The apparatus of claim 1, wherein the second stage generates input data for the first stage and the third stage receives output data generated by the first stage.

3. The apparatus of claim 1, wherein the controller is to modify an operating voltage applied to the first stage based on the comparison of the completion statuses of the first stage and the second stage.

4. The apparatus of claim 1, further comprising:
   a plurality of modules to determine the completion statuses of the first stage and the second stage.

5. The apparatus of claim 4, wherein the plurality of modules determine the completion statuses of the first stage and the second stage by monitoring output signals generated by the first stage and the second stage in response to initiating execution of tasks by the first stage and the second stage.

6. The apparatus of claim 4, further comprising:
   a first replica critical path that corresponds to a critical path in the first stage; and
   at least one second replica critical path associated with the second stage, wherein the plurality of modules determine the completion statuses of the first stage and the second stage based on output signals generated by the first replica critical path and the at least one second replica critical path in response to input signals provided to the first replica critical path and the at least one second replica critical path simultaneous with initiating execution of tasks by the first stage and the second stage.

7. The apparatus of claim 1, further comprising:
   at least one lookup table indicating estimated completion times for different instruction types, instruction opcodes, or characteristics of input data, and wherein the completion statuses of the first stage and the second stage are determined based on the completion times indicated by at least one of an instruction type, an instruction opcode, or a characteristic of input data associated with tasks executed by the first stage and the second stage.

8. The apparatus of claim 1, wherein the modification is determined based on partial completion statuses that are determined at predetermined locations within the first stage and the second stage.

9. A method comprising:
   comparing a completion status of a first stage of an asynchronous pipeline to at least one completion status of a second stage and a third stage of the asynchronous pipeline, wherein the first stage is consecutive to the second stage in the pipeline and the third stage is consecutive to the first stage in the pipeline and wherein the second stage provides an input to the first stage and wherein the first stage provides an input to the third stage;

modifying an operating speed of the first stage based on the comparison; and modifying a strength of a drive current of a buffer of the first stage based on the comparison.

10. The method of claim 9, wherein the second stage generates input data for the first stage and the third stage receives output data generated by the first stage.

11. The method of claim 9, further comprising:
determining a modification of an operating voltage to be applied to the first stage based on the comparison, and
wherein modifying the operating speed of the first stage comprises modifying the operating voltage applied to the first stage.

12. The method of claim 9, further comprising:
determining the completion statuses of the first stage and the second stage using a plurality of modules associated with the first stage and the second stage.

13. The method of claim 12, wherein determining the completion statuses comprises monitoring output signals generated by the first stage and the second stage in response to initiating execution of tasks by the first stage and the second stage.

14. The method of claim 12, wherein determining the completion statuses comprises determining monitoring output signals generated by a first replica critical path associated with the first stage and at least one second replica critical path associated with the at least one second stage, wherein the output signals are generated by the first replica critical path and the at least one second replica critical path in response to input signals provided to the first replica critical path and the at least one second replica critical path simultaneous with initiating execution of tasks by the first stage and the second stage.

15. The method of claim 12, wherein determining the completion statuses comprises determining the completion statuses based on estimated completion times stored in at least one lookup table that indicates estimated completion times for different instruction types, instruction opcodes, or characteristics of input data.

16. The method of claim 9, wherein the modification is determined based on partial completion statuses that are determined at predetermined locations within the first stage and the second stage.

17. An apparatus comprising:
an asynchronous pipeline comprising a plurality of stages including a first stage, a second stage and a third stage, wherein the first stage is consecutive to the second stage in the pipeline and the third stage is consecutive to the first stage in the pipeline and wherein the second stage provides an input to the first stage and wherein the first stage provides an input to the third stage;
a plurality of controllers modifying operating speeds of at least one of the first stage, the second stage, and the third stage on a comparison of a completion status of the first stage, the second stage, and the third stage; and
wherein the first stage includes a buffer providing a drive current to a portion of the first stage, and wherein a controller of the plurality of controllers adjusts a strength of the drive current based on the comparison of the completion statuses of the first stage and the second stage.

18. The apparatus of claim 17, wherein the plurality of controllers are modify the operating speeds by modifying at least one of an operating voltage applied to the at least one of the first stage, the second stage, and the third stage.

* * * * *